(12) United States Patent
Miyagawa et al.

(10) Patent No.: US 10,095,176 B2
(45) Date of Patent: Oct. 9, 2018

(54) COMPOSITION FOR CLEANING BLADE FOR ELECTROPHOTOGRAPHIC APPARATUS AND CLEANING BLADE FOR ELECTROPHOTOGRAPHIC APPARATUS

(71) Applicant: Sumitomo Riko Company Limited, Komaki-shi, Aichi-ken (JP)

(72) Inventors: Shimpei Miyagawa, Komaki (JP); Toshihiko Arata, Komaki (JP); Masanori Ishida, Komaki (JP); Kadai Takeyama, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days.

(21) Appl. No.: 15/787,949

(22) Filed: Oct. 19, 2017

(65) Prior Publication Data

US 2018/0039223 A1     Feb. 8, 2018

Related U.S. Application Data

(63) Continuation of application No. PCT/JP2016/059308, filed on Mar. 24, 2016.

(30) Foreign Application Priority Data

Jul. 30, 2015    (JP) ................... 2015-150265

(51) Int. Cl.
*G03G 21/00*     (2006.01)
*C08L 75/06*     (2006.01)
(Continued)

(52) U.S. Cl.
CPC ......... *G03G 21/0017* (2013.01); *C08G 18/42* (2013.01); *C08G 18/7671* (2013.01); *C08L 75/06* (2013.01); *C08L 83/12* (2013.01)

(58) Field of Classification Search
None
See application file for complete search history.

(56) References Cited

U.S. PATENT DOCUMENTS 5,930,570 A * 7/1999 Saito ..................... B29C 44/352
                                                        399/272
5,978,639 A * 11/1999 Masuda ............... G03G 15/162
                                                        399/302
(Continued)

FOREIGN PATENT DOCUMENTS

JP        57-201277 A     12/1982
JP        8-292694 A     11/1996
(Continued)

OTHER PUBLICATIONS

International Search Report dated Jun. 14, 2016, issued in counterpart International Application No. PCT/JP2016/059308 (2 pages).
(Continued)

*Primary Examiner* — Robert S Loewe
(74) *Attorney, Agent, or Firm* — Westerman, Hattori, Daniels & Adrian, LLP

(57) ABSTRACT

To provide a composition for a cleaning blade for an electrophotographic apparatus, and a cleaning blade for an electrophotographic apparatus that are capable of suppressing wear, chipping, curling, and contamination. A urethane composition contains (a) a polyester polyol, (b) a polyisocyanate, and (c) a modified silicone oil, wherein the (c) modified silicone oil contains a polysiloxane block and an alkylene oxide block, the alkylene oxide block having a hydroxyl group protected by a protecting group, and the (c) modified silicone oil has no hydroxyl group. A cleaning blade is made of a molding of the urethane composition and contains a polyurethane elastomer and the (c) modified silicone oil.

10 Claims, 2 Drawing Sheets

(51) Int. Cl.
*C08G 18/76* (2006.01)
*C08G 18/42* (2006.01)
*C08L 83/12* (2006.01)

(56) References Cited

U.S. PATENT DOCUMENTS

| | | | | |
|---|---|---|---|---|
| 6,360,069 | B1* | 3/2002 | Mimura | F16C 13/00 |
| | | | | 399/286 |
| 2007/0269239 | A1* | 11/2007 | Uchino | G03G 15/0233 |
| | | | | 399/286 |
| 2008/0019729 | A1* | 1/2008 | Hoshio | G03G 15/0225 |
| | | | | 399/100 |
| 2008/0069600 | A1* | 3/2008 | Nakamura | G03G 15/0818 |
| | | | | 399/286 |
| 2008/0081277 | A1* | 4/2008 | Nakamura | G03G 15/0818 |
| | | | | 430/111.1 |
| 2008/0103257 | A1* | 5/2008 | Tokuyama | C08L 67/025 |
| | | | | 525/165 |
| 2009/0067874 | A1* | 3/2009 | Hoshio | G03G 15/0225 |
| | | | | 399/100 |
| 2010/0150628 | A1* | 6/2010 | Miki | B29C 41/003 |
| | | | | 399/350 |

FOREIGN PATENT DOCUMENTS

| | | |
|---|---|---|
| JP | 9-218624 A | 8/1997 |
| JP | 2001-75451 A | 3/2001 |
| JP | 2003-140519 A | 5/2003 |
| JP | 2003-186366 A | 7/2003 |
| JP | 2004-279591 A | 10/2004 |

OTHER PUBLICATIONS

Decision to Grant a Patent dated May 9, 2017, issued in counterpart Japanese application No. 2015-150265, with English translation (6 pages).

* cited by examiner

COMPOSITION FOR CLEANING BLADE FOR ELECTROPHOTOGRAPHIC APPARATUS AND CLEANING BLADE FOR ELECTROPHOTOGRAPHIC APPARATUS

TECHNICAL FIELD

The present application relates to compositions for a cleaning blade for an electrophotographic apparatus, and cleaning blades for an electrophotographic apparatus.

BACKGROUND ART

In electrophotographic apparatuses such as a copier, a printer, and a facsimile apparatus using a xerography method, cleaning blades for removing toner that remains on the outer peripheries of photosensitive drums are provided.

In the cleaning blades, blade portions brought into contact with the outer peripheries of the photosensitive drums are made from a polyurethane composition. A distal end portion of each blade portion slides on the outer periphery of the rotating photosensitive drum, whereby the toner remaining on the outer periphery of the photosensitive drum is removed.

There is known, as a polyurethane composition from which a blade portion of a cleaning blade is made, a polyurethane composition made from a polyhydroxy compound containing an organopolysiloxane and a polyisocyanate (Patent Document 1).

CITATION LIST

Patent Literature

Patent Document 1: Patent JP2003-186366

SUMMARY OF INVENTION

Problems to be Solved by the Invention it is required that cleaning blades should not have problems such as wear, chipping, curling at the distal end portions of their blade portions that slide on the outer peripheries of rotating photosensitive drums. In addition, it is required that the components of the blade portions brought into contact with the outer peripheries of the photosensitive drums should not contaminate the photosensitive drums.

The present invention has been made in view of the above circumstances and an object to overcome the above problems and to provide a composition for a cleaning blade for an electrophotographic apparatus, and a cleaning blade for an electrophotographic apparatus that are capable of suppressing wear, chipping, curling, and contamination.

Means for Solving the Problem

To achieve the objects and in accordance with the purpose, a composition for a cleaning blade for an electrophotographic apparatus contains (a) a polyester polyol, (b) a polyisocyanate, and (c) a modified silicone oil. The (c) modified silicone oil contains a polysiloxane block and an alkylene oxide block, the alkylene oxide block having a hydroxyl group protected by a protecting group, and the (c) modified silicone oil has no hydroxyl group that is not protected by a protecting group.

It is preferable that the protecting group should be an acyl-based protecting group or an ether-based protecting group. It is preferable that the content of the (c) modified silicone oil should be in the range of 0.01 to 50 mass % of the total composition.

In another aspect, a cleaning blade for an electrophotographic apparatus according to the present invention is made of a molding made from the above-described composition, and contains a polyurethane elastomer formed from the (a) polyester polyol and the (b) polyisocyanate and the (c) modified silicone oil.

In the cleaning blade for an electrophotographic apparatus, it is preferable that the amount of an isocyanurate bond in a surface-side portion of the blade should be greater than an amount of an isocyanurate bond in an inner-side portion of the blade located inside the surface-side portion.

Advantageous Effects of Invention

With the above-described composition for a cleaning blade for an electrophotographic apparatus, and the above-described cleaning blade for an electrophotographic apparatus, wear, chipping, curling, and contamination can be suppressed.

MODE FOR CARRYING OUT THE INVENTION

Figure 1:
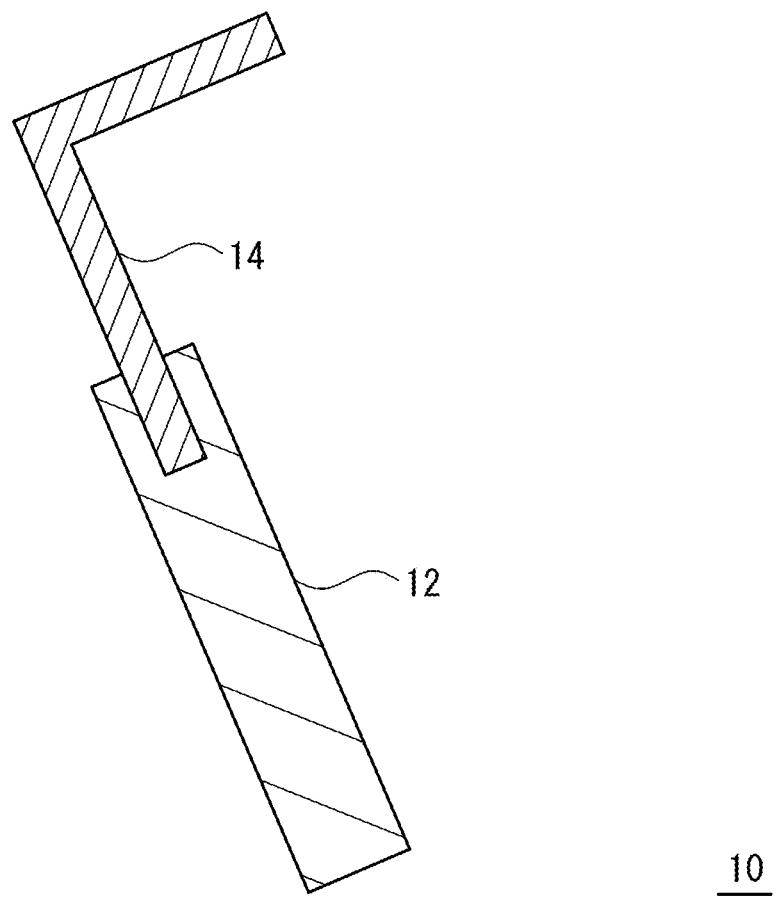
FIG. 1 is a cross-sectional view of a cleaning blade for an electrophotographic apparatus according to one embodiment of the present invention.

Hereinafter, descriptions of embodiments of the present invention will be provided referring to the drawings.

A composition for a cleaning blade for an electrophotographic apparatus according to one embodiment of the present invention (hereinafter referred to also as the present composition) consists of a urethane composition containing (a) a polyester polyol, (b) a polyisocyanate, and (c) a modified silicone oil. The (a) polyester polyol and the (b) polyisocyanate form a polyurethane elastomer.

The (a) polyester polyol is derived from a polybasic organic acid and a polyol, and preferred examples of the (a) polyester polyol include polyester polyols having a terminal hydroxy group. Using a polyester polyol as the polyol for forming a polyurethane elastomer can secure wear resistance required for durability. Examples of the polybasic organic acid include, but are not limited to, saturated fatty acids such as an oxalic acid, a succinic acid, a glutaric acid, an adipic acid, a pimelic acid, a suberic acid, an azelaic acid, a sebacic acid, and an isosebacic acid, unsaturated fatty acids such as a maleic acid and a fumaric acid, dicarboxylic acids such as aromatic acids such as a phthalic acid, an isophthalic acid, and a terephthalic acid, acid anhydrides such as a maleic acid anhydride and a phthalic anhydride, dialkyl esters such as dimethyl terephtalate, and dimer acids obtained by dimerization of unsaturated fatty acids. Examples of the polyol used in combination with the polybasic organic acid include, but are not limited to, diols such as an ethylene glycol, a diethylene glycol, a triethylene glycol, a propylene glycol, a dipropylene glycol, a butylene glycol, a neopentyl glycol, and a 1,6-hexylene glycol, triols such as trimethylol ethane, trimethylol propane, a hexane triol, and a glycerin, and hexols such as a sorbitol.

Preferred examples of the (a) polyester polyol include polyethylene adipate (PEA), polybutylene adipate (PBA), polyhexylene adipate (PHA), and a copolymer of ethylene adipate and butylene adipate (PEA/BA). Among them, a single kind of polyester polyol may be used alone, or two or more kinds of polyester polyols may be used in combination. Among them, the polybutylene adipate (PBA) is particularly preferred from the viewpoint of improvement in wear resistance and improvement of durability.

The (a) polyester polyol preferably has a number average molecular weight of 1000 to 3000. This is because the tan δ peak temperature and the tan δ peak value, which are indexes of viscoelasticity of a polyurethane elastomer, are easy to adjust, whereby securing of physical properties and improvement in moldability can be easily achieved. From this viewpoint, the (a) polyester polyol more preferably has a number average molecular weight in the range of 1500 to 2500.

Examples of the (b) polyisocyanate include a 4,4'-diphenylmethane diisocyanate (MDI), an isophorone diisocyanate (IPDI), a 4,4'-dicyclohexylmethane diisocyanate (hydrogenated MDI), a trimethylhexamethylene diisocyanate (TM-HDI), a tolylene diisocyanate (TDI), a carbodiimide-modified MDI, a polymethylene phenyl isocyanate (PAPI), an ortho-toluidine diisocyanate (TODI), a naphthylene diisocyanate (NDI), a xylene diisocyanate (XDI), a hexamethylene diisocyanate (HMDI), a paraphenylene diisocyanate (PDI), a lysine diisocyanate methyl ester (LDI), and a dimethyl diisocyanate (DDI). Among them, a single kind of polyisocyanate may be used alone, or two or more kinds of polyisocyanates may be used in combination. Among them, the 4,4'-diphenylmethane diisocyanate (MDI) is particularly preferred from the viewpoint of improvement in wear resistance, ease of handling, ease of availability, cost, and the like.

As the (b) polyisocyanate, an NCO-terminated urethane prepolymer may be used, which is obtained by reacting a polyisocyanate including the above-described MDI with a polyester polyol of the (a) polyester polyol. The urethane prepolymer used as the (b) polyisocyanate preferably has, in order to make an NCO-terminated urethane prepolymer, an NCO % in the range of 5 to 30 mass %. NCO % is calculated by the following equation.

$$NCO\% = \frac{\dfrac{\text{Polyisocyanate weight}}{\text{Polyisocyanate equivalent weight}} - \dfrac{\text{Polyol weight}}{\text{Polyol equivalent weight}} \times 42.02}{\text{Polyisocyanate weight} + \text{Polyol weight}} \times 100$$

[Mathematical 1]

It is preferable to set the amount of the (b) polyisocyanate such that the NCO index (isocyanate index) is 110 or more from the viewpoint of easy improvement in wear resistance, easy securing of strength, and improvement in fatigue resistance. The NCO index is more preferably 115 or more, and still more preferably 120 or more, 125 or more, and 130 or more. On the other hand, it is preferable to set the amount of the (b) polyisocyanate such that the NCO index is 160 or less from the viewpoint that the (b) polyisocyanate gets not too hard, satisfies cleaning performance at low temperatures, and is easy to mold. The NCO index is more preferably 155 or less, and still more preferably 150 or less, and 145 or less. The NCO index is calculated as the equivalent weight of an isocyanate group with respect to the total 100 equivalent weight of an active hydrogen group (e.g., a hydroxyl group, and an amino group) that react with the isocyanate group.

The (c) modified silicone oil contains a polysiloxane block and an alkylene oxide block, the alkylene oxide block having a hydroxyl group protected by a protecting group, and the (c) modified silicone oil has no hydroxyl group that is not protected by a protecting group. Modification by the alkylene oxide block may be terminal-type modification in which a terminal of a polysiloxane chain of the silicone oil is modified (modification in which the silicone oil has an alkylene oxide block at a terminal of a polysiloxane chain), or side-chain-type modification in which a side chain to a polysiloxane chain of the silicone oil is modified (modification in which the silicone oil has an alkylene oxide block at a side chain to a polysiloxane chain). Alternatively, modification by the alkylene oxide block may be side-chain terminal modification in which both of a terminal of a polysiloxane chain of the silicone oil and a side chain to a polysiloxane chain of the silicone oil are modified. The terminal-type modification may be one-terminal-type modification in which one terminal of a polysiloxane chain of the silicone oil is modified, or both-terminal-type modification in which both terminals of a polysiloxane chain of the silicone oil are modified.

A polysiloxane has an organic group (i.e., a polysiloxane is an organopolysiloxane). The organic group is a substituted or unsubstituted monovalent hydrocarbon group. Examples of the unsubstituted hydrocarbon group include alkyl groups such as a methyl group, an ethyl group, a propyl group, a butyl group, a hexyl group, and a dodecyl group, aryl groups such as a phenyl group, and aralkyl groups such as a beta-phenylethyl group and a beta-phenylpropyl group. Examples of the substituted hydrocarbon group include a chloromethyl group and a 3,3,3-trifluoropropyl group. As the polysiloxane, polysiloxanes having a methyl group as an organic group is preferred from the viewpoint of ease of synthesis or the like. To be specific, a polydimethylsiloxane having a repeating unit of a dimethylsiloxane is preferred. The polysiloxane is preferably linear; however, it may be branched or cyclic.

Examples of the alkylene oxide include an ethylene oxide, a propylene oxide, and a butylene oxide. The repeating unit number of the alkylene oxide in the alkylene oxide block contained in the (c) modified silicone oil may be one, or two or more. From the viewpoint of compatibility with the polyurethane elastomer, the repeating unit number of the alkylene oxide is preferably two or more, and more preferably three or more.

Examples of the protecting group for the hydroxyl group of the alkylene oxide block include an ether-based protecting group, an acyl-based protecting group, an acetal-based protecting group, and a silyl ether-based protecting group. Among them, from the viewpoint of improvement in compatibility with the polyurethane elastomer, the ether-based protecting group and the acyl-based protecting group are preferred.

The ether-based protecting group defines a protecting group for etherifying a hydroxyl group, and examples of the ether-based protecting group include a methyl group, a benzyl group, a p-methoxybenzyl group, and a tert-butyl group. The acyl-based protecting group defines a protecting group for acylating a hydroxyl group, and examples of the acyl-based protecting group include an acetyl group, a pivaloyl group, and a benzoyl group. The acetal-based protecting group defines a protecting group for acetalizing a hydroxyl group, and examples of the acetal-based protecting group include a methoxymethyl group, a 2-tetrahydropyranyl group, and an ethoxyethyl group. The silyl ether-based protecting group defines a protecting group for silyl etherifying a hydroxyl group, and examples of the silyl ether-based protecting group include a trimethylsilyl group, a triethylsilyl group, a tert-butyldimethylsilyl group, a triisopropylsilyl group, and a tert-butyldiphenylsilyl group.

The (c) modified silicone oil is contained as a silicone oil component in the urethane composition. The (c) modified silicone oil excludes a modified silicone oil in which a silicone structure is integrated into the structure of the (a) polyester polyol, a modified silicone oil in which a silicone structure is integrated into the structure of the NCO-terminated urethane prepolymer that is the (b) polyisocyanate (e.g., a modified silicone oil in which a silicone oil having an OH group is contained as the polyol constituting the urethane polymer), or the like.

One preferred example of the structural formula of the (c) modified silicone oil is indicated below. In Chemical formula (1), the polysiloxane block is linear, and the (c) modified silicone oil is of a one-terminal type in which one terminal of the polysiloxane chain is modified. In Chemical formula (2), the polysiloxane block is linear, and the (c) modified silicone oil is of a side-chain type in which a side chain to the polysiloxane chain is modified.

[Chemical 1]

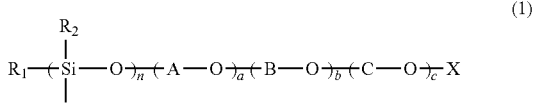

(1)

[Chemical 2]

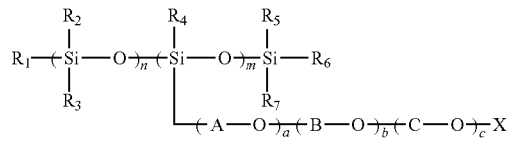

In Chemical formulae (1) and (2), n, m, a, b, and c represent repeating unit numbers, where n, m, and a are integers of one or more, and b and c are integers of zero or one or more. R1 to R7 are organic groups of the above-described polysiloxane, and substituted or unsubstituted monovalent hydrocarbon groups. R1 to R7 may be the same organic groups, or may be organic groups different or partially different from one another. A, B, and C are alkylene groups, and may be the same alkylene groups, or may be alkylene groups different or partially different from one another. X is a protecting group for a hydroxyl group of an alkylene oxide block, and examples thereof include an ether-based protecting group, an acyl-based protecting group, an acetal-based protecting group, and a silyl ether-based protecting group. Specific examples thereof include an alkyl group and an acyl group.

The (c) modified silicone oil, as containing the polysiloxane block, reduces the friction coefficient of the cleaning blade to reduce the frictional force produced when the cleaning blade slides, and demonstrates the effect of suppressing the wear of the cleaning blade. In addition, the (c) modified silicone oil, as containing the alkylene oxide block, has improved compatibility with a polyurethane matrix of the cleaning blade, and demonstrates the effect of suppressing contamination due to bleeding. In addition, since the hydroxyl group of the alkylene oxide block is protected by the protecting group, and the (c) modified silicone oil has no hydroxyl group that is not protected by a protecting group, the (c) modified silicone oil does not react with the polyurethane matrix of the cleaning blade, and is not incorporated into the cleaning blade, sufficiently exhibiting a desired function.

The (c) modified silicone oil preferably has a number average molecular weight of 1000 to 8000, and more preferably has a number average molecular weight of 2000 to 4000. The molecular weight is not too light in the (c) modified silicone oil having a number average molecular weight of 1000 or more, so that the (c) modified silicone oil can easily suppress contamination due to bleeding. The molecular weight is not too heavy in the (c) modified silicone oil having a number average molecular weight of 8000 or less, so that the (c) modified silicone oil has improved compatibility with the polyurethane matrix of the cleaning blade, and can easily suppress contamination due to bleeding.

The content of the (c) modified silicone oil is preferably 0.01 mass % or more of the total composition from the viewpoint of sufficiently demonstrating the addition effect of reducing the friction coefficient of the cleaning blade. The content of the (c) modified silicone oil is more preferably 0.05 mass % or more, and still more preferably 0.1 mass % or more. On the other hand, the content of the (c) modified silicone oil is preferably 50 mass % or less of the total composition from the viewpoint of easily suppressing contamination due to bleeding. The content of the (c) modified silicone oil is more preferably 40 mass % or less, and still more preferably 30 mass % or less.

The present composition may contain a chain extender, a cross-linking agent, a catalyst, a blowing agent, a surface acting agent, a flame retardant, a coloring agent, a filler, a plasticizer, a stabilizer, a mold-releasing agent, or the like, in addition to the above-described (a) to (c) components.

The chain extender defines a bifunctional compound such as a diol and a diamine capable of reacting with polyurethane. Chain extenders having a number average molecular weight of 300 or less are preferred. Examples of the chain extender include diols such as a 1,4-butanediol (1,4-BD), an ethylene glycol (EG), a 1,6-hexanediol (1,6-HD), a diethylene glycol (DEG), a propylene glycol (PG), a dipropylene glycol (DPG), a 1,4-cyclohexanediol, a 1,4-cyclohexanedimethanol, a xylene glycol, and triethylene glycol, and aromatic diamines such as 2,2',3,3'-tetrachloro-4,4'-diaminodiphenylmethane, 3,3'-dichloro-4,4'-diphenylmethane, trimethylene-bis(4-aminobenzoate), and 4,4'-diamino-3,3'-diethyl-5,5'-dimethyl-diphenylmethane. Among them, a single kind of chain extender may be used alone, or two or more kinds of chain extenders may be used in combination. Among them, the 1,4-butanediol (1,4-BD), the ethylene glycol (EG), the 1,6-hexanediol (1,6-HD) are preferred from the viewpoint that the international rubber hardness of the polyurethane elastomer, and the tanδ peak temperature and the tanδ peak value, which are indexes of viscoelasticity of the polyurethane elastomer, are easy to adjust, whereby securing of physical properties and improvement in moldability can be easily achieved.

A cross-linking agent defines a tri- or higher functional compound such as a triol and a triamine capable of reacting with polyurethane. Cross-linking agents having a number average molecular weight of 300 or less are preferred. Examples of the cross-linking agent include a trimethylolpropane (TMP), glycerin, pentaerythritol, sorbitol, and a 1,2,6-hexane triol. Among them, a single kind of cross-linking agent may be used alone, or two or more kinds of cross-linking agents may be used in combination. Among them, the trimethylolpropane (TMP) is preferred from the viewpoint that the international rubber hardness of the polyurethane elastomer, and the tanδ peak temperature and the tanδ peak value, which are indexes of viscoelasticity of the polyurethane elastomer, are easy to adjust, whereby securing of physical properties and improvement in moldability can be easily achieved.

The catalyst is not particularly limited, and examples of the catalyst include amine-based compounds such as a tertiary amine, and organometallic compounds such as an organotin compound. Examples of the tertiary amine include trialkylamines such as a triethylamine, tetraalkyl diamines such as an N,N,N',N'-tetramethyl-1,3-butanediamine, amino alcohols such as a dimethylethanolamine, ester amines such as an ethoxylated amine, an ethoxylated diamine, and bis (diethylethanolamine) adipate, cyclohexylamine derivatives such as a triethylenediamine (TEDA), and an N,N-dimethylcyclohexylamine, morpholine derivatives such as an N-methylmorpholine, and an N-(2-hydroxypropyl)-dimethyl morpholine, and piperazine derivatives such as an N,N'-diethyl-2-methyl piperazine and an N,N'-bis-(2-hydroxypropyl)-2-methyl piperazine. Examples of the organotin compound include dialkyltin compounds such as dibutyltin dilaurate and dibutyltin di(2-ethylhexoate), 2-ethylcaproate stannous, and stannous oleate. Among them, a single kind of catalyst may be used alone, or two or more kinds of catalysts may be used in combination. Among them, the triethylenediamine (TEDA) is preferred from the viewpoint of being hardly hydrolyzed, and less contaminated due to bleeding.

Figure 2:
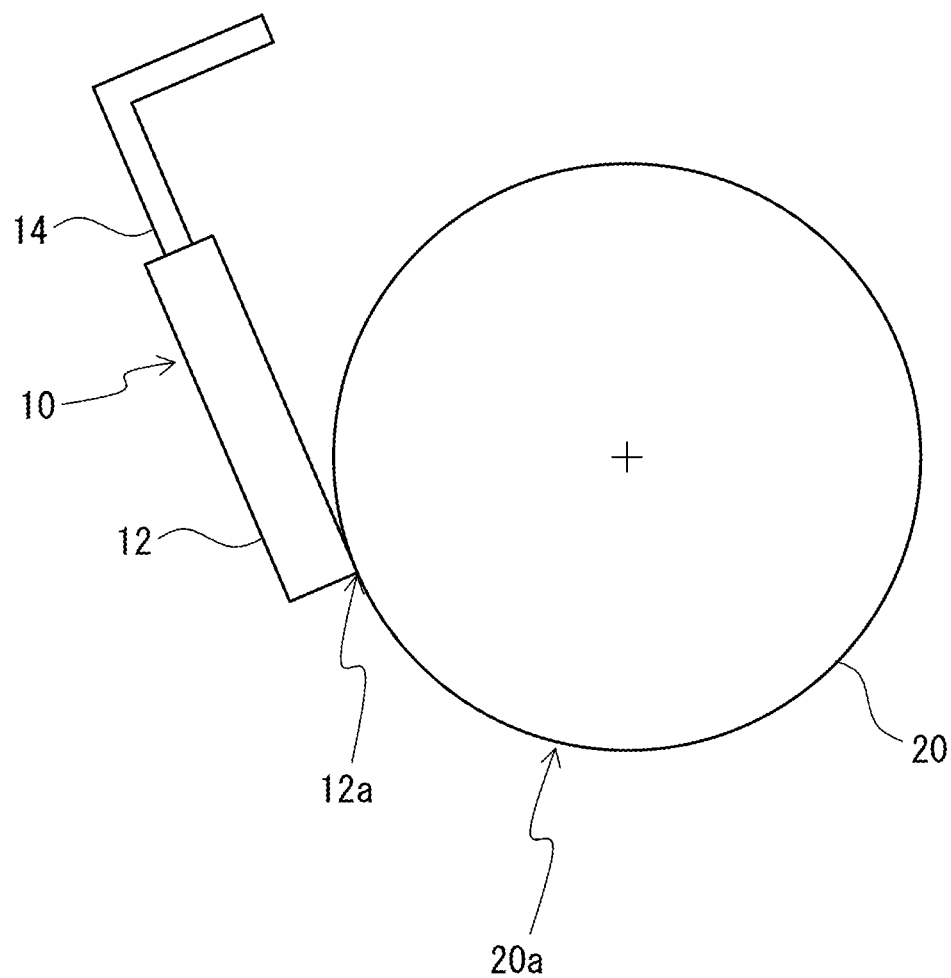
FIG. 2 is a schematic view of the cleaning blade for an electrophotographic apparatus according to the one embodiment of the present invention that is sliding on the outer periphery of a rotating photosensitive drum.

A cleaning blade for an electrophotographic apparatus according to one embodiment of the present invention (hereinafter referred to also as the present blade) is obtained by molding the present composition having the above-described configuration into a predetermined shape. A cleaning blade 10 for an electrophotographic apparatus according to one embodiment of the present invention includes a blade portion 12 as illustrated in FIG. 1. A holding portion 14 for holding the blade portion 12 is attached to the blade portion 12. The blade portion 12 is formed by molding the present composition into a predetermined shape. The blade portion 12 has a flat plate shape. The holding portion 14 is made of a metal fitting of an L-shaped cross section. As illustrated in FIG. 2, the blade portion 12 is brought into contact with an outer periphery 20a of a photosensitive drum 20 at its distal end portion 12a, and slides on the outer periphery 20a of the rotating photosensitive drum 20. Thus, toner remaining on the outer periphery 20a of the photosensitive drum 20 is removed.

The present composition, as containing the (c) modified silicone oil, reduces the friction coefficient of the present blade to reduce the frictional force produced when the present blade slides, and demonstrates the effect of suppressing the wear of the present blade. For this reason, there is no need to cure the polyurethane elastomer to suppress the wear. Thus, the friction coefficient of the present blade can be reduced while flexibility is maintained. In addition, since the polyurethane elastomer need not be cured, the present blade can be prevented from being chipped due to brittleness. Meanwhile, when the polyurethane elastomer is flexible, the present blade has an increased contact area in addition to being soft, and is likely to curl up at the contact portion when sliding on the outer periphery of the photosensitive drum. However, since the present composition, as containing the (c) modified silicone oil, reduces the friction coefficient of the present blade, the present blade can be prevented from curling up while being flexible. Since the (c) modified silicone oil, as containing alkylene oxide block, has improved compatibility with the polyurethane elastomer, contamination due to bleeding can be suppressed. In addition, since in the (c) modified silicone oil, the hydroxyl group of the alkylene oxide block is protected by the protecting group, and the (c) modified silicone oil has no hydroxyl group that is not protected by a protecting group, the (c) modified silicone oil does not react with the polyurethane matrix of the present blade, and is not incorporated into the present blade, sufficiently exhibiting a desired function.

The present blade preferably has a dynamic friction coefficient lower than 0.90 from the viewpoint of suppressing wear and curling, more preferably has a dynamic friction coefficient of 0.89 or lower, and still more preferably has a dynamic friction coefficient of 0.85 or lower. The present blade preferably has a hardness of 60 or higher from the viewpoint of suppressing wear and curling, more preferably has a hardness of 65 or higher, and still more preferably has a hardness of 70 or higher. On the other hand, the present blade preferably has a hardness of 90 or lower from the viewpoint of suppressing chipping of the present blade, more preferably has a hardness of 85 or lower, and still more preferably has a hardness of 80 or lower. The dynamic friction coefficient μk is measured by pressing a metal plate member on the surface of which a PET sheet having a thickness of 150 μm is placed against the cleaning blade (a pressing angle θ: 60 degrees, a pressing force: 1 N/cm) to move the cleaning blade at a speed of 2.5 mm/sec. As for the hardness, an international rubber hardness is measured in accordance with JIS K 6253 with the use of a Wallace micrometer hardness tester manufactured by H.W.WALLACE under the measurement conditions of 25 degrees C. and 50% RH in an international rubber hardness testing method, M method. The dynamic friction coefficient can be adjusted to be a desired value depending on the type and the amount of the (c) modified silicone oil, and the type and the hardness of the polyurethane elastomer. The hardness can be adjusted to be a desired value depending on the type and the composition of the polyurethane elastomer.

The present blade can be produced from the present composition in a conventional method such as a prepolymer method, a semi one-shot method, and a one-shot method. For example, the present blade can be produced in the following manner. First, a urethane prepolymer (a main agent solution) is prepared by blending (a) a polyester polyol and (b) a polyisocyanate at a predetermined ratio (NCO %) to react them in predetermined reaction conditions. Meanwhile, a curing agent solution is prepared by blending (a) a polyester polyol and (c) a modified silicone oil, and a chain extender, a catalyst, and the like if necessary, at a predetermined ratio in predetermined reaction conditions. Then, a urethane composition that is blended at a predetermined ratio to be mixed such that the main agent solution and the curing agent solution have predetermined indexes is poured into a molding die for a cleaning blade on which a holding tool is mounted, and reacted to be cured. The resulting cured product of the urethane composition is removed from the molding die for a cleaning blade to be worked into a predetermined shape. In this manner, the present blade including the blade portion made of the cured product of the urethane composition and integrally molded with the holding portion as illustrated in FIG. 1 is obtained.

In the present blade, setting the NCO index of the present composition to higher than 100 can increase the isocyanurate bonds in the polyurethane elastomer, whereby the wear resistance can be improved. At this time, if the isocyanurate bonds are uniformly increased throughout the present blade, the present blade becomes too hard overall to be likely to cause a problem of chipping due to brittleness. Thus, it is preferable that the amount of the isocyanurate bonds in a surface-side portion of the present blade should be greater than the amount of the isocyanurate bonds in an inner-side portion of the blade located inside the surface-side portion. For example, by applying the above-described catalyst to the inner surface of the molding die fora cleaning blade (die surface) to pour the polyurethane composition into the die, the surface-side portion can be isocyanurated more than the inner-side portion, whereby the amount of the isocyanurate bonds in the surface-side portion can be made greater than the amount of the isocyanurate bonds in the inner-side portion.

EXAMPLE

Hereinafter, the present invention will be described in detail with reference to the examples, but the present invention is not limited to these configurations.

Detailed descriptions of the used materials are provided below.

<Polyol>

PBA (polybutylene adipate): "NIPPORAN 4010" manufactured by NIPPON POLYURETHANE INDUSTRY CO., LTD., a number average molecular weight Mn=2000

PEA/BA (an ethylene adipate/butylene adipate copolymer): "NIPPORAN 4042" manufactured by NIPPON POLYURETHANE INDUSTRY CO., LTD., a number average molecular weight Mn=2000

PEA (polyethylene adipate): "NIPPORAN 4040" manufactured by NIPPON POLYURETHANE INDUSTRY CO., LTD., a number average molecular weight Mn=2000

PHA (polyhexylene adipate): "NIPPORAN 4073" manufactured by NIPPON POLYURETHANE INDUSTRY CO., LTD., a number average molecular weight Mn=2000

PTMG (a polytetramethylene ether glycol): "PTMG2000" manufactured by MITSUBISHI CHEMICAL CORPORATION, a number average molecular weight Mn=2000

<Polyisocyanate>

MDI (a 4,4'-diphenylmethane diisocyanate): "MILLIONATE MT" manufactured by NIPPON POLYURETHANE INDUSTRY CO., LTD., <Chain Extender>

1,4BD (a 1,4-butanediol): manufactured by MITSUBISHI CHEMICAL CORPORATION

EG (an ethylene glycol): manufactured by MITSUBISHI CHEMICAL CORPORATION 1,6HD (a 1,6-hexane diol): manufactured by KANTO CHEMICAL CO., INC.

<Cross-Linking Agent>

TMP (trimethylol propane): manufactured by MITSUBISHI GAS CHEMICAL CO., INC.

<Catalyst>

TEDA (a triethylenediamine): manufactured by TOSOH CORPORATION

<Friction-Reducing Treatment Agent>

SH8400: a polyether-modified silicone oil manufactured by DOW CORNING TORAY CO., LTD., of a side chain type, having a terminal acyl group FZ-2110: a polyether-modified silicone oil manufactured by DOW CORNING TORAY CO., LTD., of a side chain type, having a terminal alkoxy group Dimethyl propylene diglycol (DMPDG): manufactured by NIPPON NYUKAZAI CO., LTD.

SF8416: an alkyl-modified silicone oil manufactured by DOW CORNING TORAY CO., LTD., alkyl group-terminated SH3773M: a methyl polysiloxane/polyoxyethylene copolymer (a polyether-modified silicone oil) manufactured by DOW CORNING TORAY CO., LTD., having a terminal OH group X-22-176DX: a one-terminal reactive silicone oil manufactured by SHIN-ETSU CHEMICAL CO., LTD., having a terminal OH group Examples 1 to 13, Comparative Examples 1 to 5

<Preparation of Main Agents (Urethane Prepolymers)>

The polyols and the polyisocyanates were mixed so as to have the blending ratios (parts by mass) and the NCO % indicated in Tables 1 and 2, and the mixtures were subjected to reaction under an $N_2$ purge for 180 minutes at 80 degrees C., and thus the main agents (NCO-terminated urethane prepolymer) were prepared.

<Preparation of Curing Agents>

The polyols, the chain extenders, the cross-linking agents, the catalysts, and the friction-reducing treatment agents were mixed so as to have the blending ratios (parts by mass) and the OH values indicated in Tables 1 and 2, and thus the curing agents were prepared.

<Preparation of Urethane Compositions>

The main agents (urethane prepolymers) and the curing agents were mixed for one minute at 60 degrees C. under a vacuum atmosphere so as to have the NCO indexes indicated in Tables 1 and 2, and then the mixtures were sufficiently defoamed. Thus, the urethane compositions were prepared.

<Production of Cleaning Blades>

A plate-shaped holding tool was placed in a molding die for a cleaning blade, each of the urethane compositions was poured into the molding die, the molding die was heated up to 130 degrees C. to cure the urethane composition, and the urethane composition was demolded. Thus, each cleaning blade was produced.

For each of the produced cleaning blades, the hardness and the dynamic friction coefficient were measured, and evaluations of bleeding, curling, and chipping were made. The ingredient composition and the results of measurement and evaluation are indicated in Tables 1 and 2.

(Hardness)

International rubber hardnesses were measured in accordance with JIS K 6253 with the use of a Wallace micrometer hardness tester manufactured by H.W.WALLACE under the measurement conditions of 25 degrees C. and 50% RH in an international rubber hardness testing method, M method.

(Dynamic Friction Coefficient)

Dynamic friction coefficients μk were measured by pressing a metal plate member on the surface of which a PET sheet having a thickness of 150 μm was placed against each of the cleaning blades (a pressing angle θ: 60 degrees, a pressing force: 1 N/cm) to move the cleaning blades at a speed of 2.5 mm/sec.

(Bleeding)

Each of the produced cleaning blades was charged under an environment of 50 degrees C. and 95% RH for seven days, and then the surface of the each of the cleaning blades was magnified and observed to determine the presence or absence of a bleeding substance before and after the charge. The cleaning blades that had no difference before and after the charge were rated "A" while the cleaning blades that had a difference before and after the charge were rated "C".

(Curling)

Each of the cleaning blades was mounted on a cartridge of a commercially available laser printer ("LASER JET P3015DN" manufactured by HEWLETT-PACKARD JAPAN, LTD.) from which toner was removed, and then the photosensitive drum of the printer was rotated under an environment of 32 degrees C. and 85% RH for 30 seconds. Under normal conditions, toner in a cartridge would serve a lubrication function to less cause curling in the beginning (30 seconds). In a state where toner is removed, curling is likely to occur in the beginning. In the situation where curling was likely to occur, the cleaning blades in which no curling occurred in 30 seconds were rated "A", which meant very good, the cleaning blades in which no curling occurred in 15 seconds or more were rated "B", which meant good, and the cleaning blades in which curling occurred in 15 seconds or less were rated "C", which meant poor.

(Chipping)

Each of the cleaning blades was mounted on a cartridge of a commercially available laser printer ("LASER JET P3015DN" manufactured by HEWLETT-PACKARD JAPAN, LTD.), and then image output of 12000 sheets of A4-size paper (image: a horizontal line image of 2% density) was carried out under an environment of 23 degrees C. and 50% RH. After the printing of 12000 sheets, a black image, a halftone image, and a white image were printed to confirm the images. The images in which no defect such as a streak or dirt caused by "chipping" was found after the printing of 12000 sheets were rated "A", which meant very good, the images in which some streaks that were within the permissible range were slightly found after the printing of 12000 sheets were rated "B", which meant good, and the images in which some defects such as a streak or dirt that were outside the permissible range were found were rated "C", which meant poor.

TABLE 1

| | | | Example | | | | | | |
|---|---|---|---|---|---|---|---|---|---|
| | | | 1 | 2 | 3 | 4 | 5 | 6 | 7 |
| Main agent | Polyol | PBA | 50 | 50 | 50 | — | — | — | 50 |
| | | PEA/BA | — | — | — | 50 | — | — | — |
| | | PEA | — | — | — | — | 50 | — | — |
| | | PHA | — | — | — | — | — | 50 | — |
| | | PTMG | — | — | — | — | — | — | — |
| | Polyisocyanate | MDI | 50 | 50 | 50 | 50 | 50 | 50 | 50 |
| | NCO % | | 14.7 | 14.7 | 14.7 | 14.7 | 14.7 | 14.7 | 14.7 |
| Curing agent | Polyol | PBA | 100 | 100 | 100 | — | — | — | 100 |
| | | PEA/BA | — | — | — | 100 | — | — | — |
| | | PEA | — | — | — | — | 100 | — | — |
| | | PHA | — | — | — | — | — | 100 | — |
| | | PTMG | — | — | — | — | — | — | — |
| | Chain extender | 1,4BD | 7 | 5 | 2 | 5 | 5 | 5 | — |
| | | EG | — | — | — | — | — | — | 5 |
| | | 1,6HD | — | — | — | — | — | — | — |
| | Cross-linking agent | TMP | 3 | 5 | 8 | 5 | 5 | 5 | 5 |
| | Catalyst | TEDA | 0.02 | 0.02 | 0.02 | 0.02 | 0.02 | 0.02 | 0.02 |
| | Friction-reducing treatment agent | Modified silicone oil | 10 | 10 | 10 | 10 | 10 | 10 | 10 |
| | | Dimethyl propylene diglycol | — | — | — | — | — | — | — |
| | OH value | | 149.9 | 150.0 | 150.2 | 150.8 | 150.8 | 150.8 | 173.5 |
| Amount of friction-reducing treatment agent in all materilas (% by mass) | | | 4.0 | 4.0 | 4.0 | 4.0 | 4.0 | 4.0 | 3.7 |
| NCO index | | | 140 | 140 | 140 | 140 | 140 | 140 | 140 |
| Composition of friction-reducing treatment agent | Polysiloxane block | | Present | Present | Present | Present | Present | Present | Present |
| | Alkylene oxide block | | Present | Present | Present | Present | Present | Present | Present |
| | Hydroxyl group | | Absent | Absent | Absent | Absent | Absent | Absent | Absent |
| | Protecting group | | Acyl group | Acyl group | Acyl group | Acyl group | Acyl group | Acyl group | Acyl group |
| | Type | | SH8400 | SH8400 | SH8400 | SH8400 | SH8400 | SH8400 | SH8400 |
| Product evaluation | Hardness | | 80 | 76 | 60 | 76 | 77 | 74 | 76 |
| | Dynamic friction coefficient ($\mu k$) | | 0.08 | 0.75 | 0.75 | 0.73 | 0.74 | 0.88 | 0.76 |
| | Bleeding | | A | A | A | A | A | A | A |
| | Curling | | A | A | B | A | A | B | A |
| | Chipping | | B | A | A | A | A | A | A |

TABLE 1-continued

| | | | Example | | | | | |
|---|---|---|---|---|---|---|---|---|
| | | | 8 | 9 | 10 | 11 | 12 | 13 |
| Main agent | Polyol | PBA | 50 | 50 | 50 | 50 | 50 | 50 |
| | | PEA/BA | — | — | — | — | — | — |
| | | PEA | — | — | — | — | — | — |
| | | PHA | — | — | — | — | — | — |
| | | PTMG | — | — | — | — | — | — |
| | Polyisocyanate | MDI | 50 | 50 | 50 | 50 | 50 | 50 |
| | NCO % | | 14.7 | 14.7 | 14.7 | 14.7 | 14.7 | 14.7 |
| Curing agent | Polyol | PBA | 100 | 100 | 100 | 100 | 100 | 100 |
| | | PEA/BA | — | — | — | — | — | — |
| | | PEA | — | — | — | — | — | — |
| | | PHA | — | — | — | — | — | — |
| | | PTMG | — | — | — | — | — | — |
| | Chain extender | 1,4BD | — | 5 | 5 | 5 | 5 | 5 |
| | | EG | — | — | — | — | — | — |
| | | 1,6HD | 5 | — | — | — | — | — |
| | Cross-linking agent | TMP | 5 | 5 | 5 | 5 | 5 | 5 |
| | Catalyst | TEDA | 0.02 | 0.02 | 0.02 | 0.02 | 0.02 | 0.02 |
| | Friction-reducing treatment agent | Modified silicone oil | 10 | 10 | 10 | 0.02 | 240 | 10 |
| | | Dimethyl propylene diglycol | — | — | — | — | — | — |
| | OH value | | 137.6 | 150.0 | 150.0 | 163.6 | 51.4 | 150.0 |
| Amount of friction-reducing treatment agent in all materilas (% by mass) | | | 4.2 | 4.5 | 3.4 | 0.01 | 50.2 | 4.0 |
| NCO index | | | 140 | 110 | 190 | 140 | 140 | 140 |
| Composition of friction-reducing treatment agent | | Polysiloxane block | Present | Present | Present | Present | Present | Present |
| | | Alkylene oxide block | Present | Present | Present | Present | Present | Present |
| | | Hydroxyl group | Absent | Absent | Absent | Absent | Absent | Absent |
| | | Protecting group | Acyl group | Acyl group | Acyl group | Acyl group | Acyl group | Alkyl group |
| | | Type | SH8400 | SH8400 | SH8400 | SH8400 | SH8400 | FZ-2110 |
| Product evaluation | Hardness | | 74 | 65 | 90 | 75 | 71 | 75 |
| | Dynamic friction coefficient (μk) | | 0.81 | 0.74 | 0.77 | 0.85 | 0.40 | 0.71 |
| | Bleeding | | A | A | A | A | B | A |
| | Curling | | B | B | A | B | A | A |
| | Chipping | | A | A | B | A | A | A |

TABLE 2

| | | | Comparative Example | | | | |
|---|---|---|---|---|---|---|---|
| | | | 1 | 2 | 3 | 4 | 5 |
| Main agent | Polyol | PBA | 50 | 50 | 50 | 50 | — |
| | | PEA/BA | — | — | — | — | — |
| | | PEA | — | — | — | — | — |
| | | PHA | — | — | — | — | — |
| | | PTMG | — | — | — | — | 50 |
| | Polyisocyanate | MDI | 50 | 50 | 50 | 50 | 50 |
| | NCO % | | 14.7 | 14.7 | 14.7 | 14.7 | 14.7 |
| Curing agent | Polyol | PBA | 100 | 100 | 100 | 100 | — |
| | | PEA/BA | — | — | — | — | — |
| | | PEA | — | — | — | — | — |
| | | PHA | — | — | — | — | — |
| | | PTMG | — | — | — | — | 100 |
| | Chain extender | 1,4BD | 5 | 5 | 5 | 5 | 5 |
| | | EG | — | — | — | — | — |
| | | 1,6HD | — | — | — | — | — |
| | Cross-linking agent | TMP | 5 | 5 | 5 | 5 | 5 |

TABLE 2-continued

|  |  | Comparative Example | | | | |
|---|---|---|---|---|---|---|
|  |  | 1 | 2 | 3 | 4 | 5 |
|  | Catalyst TEDA | 0.02 | 0.02 | 0.02 | 0.02 | 0.02 |
|  | Friction-reducing treatment agent | Modified silicone oil | — | 10 | 10 | 10 | 10 |
|  |  | Dimethyl propylene diglycol | 10 | — | — | — | — |
|  | OH value |  | 150.0 | 150.0 | 150.0 | 150.0 | 150.8 |
| Amount of friction-reducing treatment agent in all materilas (% by mass) |  |  | 4.0 | 4.0 | 4.0 | 4.0 | 4.0 |
| NCO index |  |  | 140 | 140 | 140 | 140 | 140 |
| Composition of friction-reducing treatment agent | Polysiloxane block |  | Absent | Present | Present | Present | Present |
|  | Alkylene oxide block |  | Present | Absent | Present | Absent | Present |
|  | Hydroxyl group |  | Absent | Absent | Present | Present | Absent |
|  | Protecting group |  | Alkyl group | Alkyl group | Absent | Absent | Acyl group |
|  | Type |  | DMPDG | SF8416 | SH3773M | X-22-176DX | SH8400 |
| Product evaluation | Hardness |  | 75 | 74 | 60 | 74 | 75 |
|  | Dynamic friction coefficient (μk) |  | 1.20 | 1.10 | 1.00 | 1.12 | 0.95 |
|  | Bleeding |  | A | C | A | C | A |
|  | Curling |  | C | C | C | C | B |
|  | Chipping |  | C | A | A | A | C |

The composition of Comparative Example 1 contains no silicone oil. Thus, the cleaning blade according to Comparative Example 1 has a high dynamic friction coefficient, and cannot be prevented from curling up. In addition, the cleaning blade is chipped due to the high dynamic friction coefficient, which deteriorates the images. The composition of Comparative Example 2 contains a silicone oil that contains no alkylene oxide block, so that the silicone oil has poor compatibility with the polyurethane elastomer that is a matrix polymer, and bleeding occurs. In addition, while the cleaning blade according to Comparative Example 2 does not curl up in the beginning, the silicone oil comes out at a time, and the cleaning blade cannot be prevented from curling up in the end. The composition of Comparative Example 3 contains a silicone oil that contains an alkylene oxide block while having reactive hydroxyl groups at its terminals, so that a silicone structure is integrated into the structure of the polyurethane elastomer by reaction. Thus, the cleaning blade according to Comparative Example 3 has a high dynamic friction coefficient, and cannot be prevented from curling up. The composition of Comparative Example 4 contains a silicone oil that contains no alkylene oxide block while having reactive hydroxyl groups at its terminals, so that a silicone structure is integrated into the structure of the polyurethane elastomer by reaction. Thus, the cleaning blade according to Comparative Example 4 has a high dynamic friction coefficient, and cannot be prevented from curling up. The composition of Comparative Example 5 contains a polyol that is not a polyester polyol but a polyether polyol, so that the cleaning blade according to Comparative Example 5 has poor durability, and is worn and chipped. In addition, the cleaning blade according to Comparative Example 5 has a high dynamic friction coefficient.

In contrast, in the present examples, each of the contained silicone oils contains a polysiloxane block and an alkylene oxide block, the alkylene oxide block having a hydroxyl group protected by a protecting group, and defines a modified silicone oil having no hydroxyl group that is not protected by a protecting group. Thus, the cleaning blades according to the present examples have low dynamic friction coefficients even if the polyurethane elastomers are not cured. In addition, each of the contained silicone oils has improved compatibility with the polyurethane elastomer. Thus, wear, chipping, curling, and contamination due to bleeding can be suppressed.

Having thus described in detail embodiments of the present invention, the present invention is not intended to be limited to the above embodiments, various modifications are possible without departing from the scope of the present invention.

What is claimed is:

1. A cleaning blade for an electrophotographic apparatus, the cleaning blade comprising a molding made from a composition comprising:
    (a) a polyester polyol;
    (b) a polyisocyanate; and
    (c) a modified silicone oil,
    the content of the modified silicone oil (c) being in a range of 0.01 to 50 mass % of the total composition, the polyester polyol (a) and the polyisocyanate (b) forming a polyurethane elastomer in the molding,
    wherein the modified silicone oil (c) comprises a polysiloxane block and an alkylene oxide block, the alkylene oxide block having a hydroxyl group protected by a protecting group comprising an acyl- or ether-based protecting group, and the modified silicone oil (c) comprises no hydroxyl group that is not protected by the protecting group.

2. The cleaning blade for an electrophotographic apparatus according to claim 1, wherein the blade comprises a surface-side portion and an inner-side portion located inside the surface side portion, the surface-side portion comprising a larger amount of isocyanurate bonds than the inner-side portion.

3. The cleaning blade according to claim 2, wherein the blade has a dynamic friction coefficient lower than 0.90.

4. The cleaning blade according to claim 3, wherein the blade has an international rubber hardness degree of 60 or higher.

5. The cleaning blade according to claim 4, wherein the modified silicone oil (c) has a structure represented by Chemical formula (1) or (2):

[Chemical Formula 1]

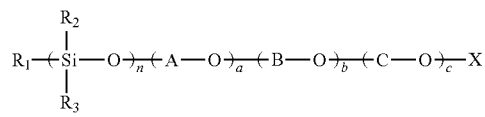

(1)

[Chemical Formula 2]

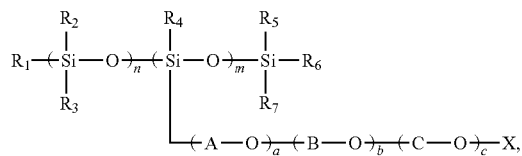

(2)

where n, m, a, b, and c represent repeating unit numbers, n, m, and a being integers of one or more, b and c being integers of zero or one or more;

R1 to R7 are organic groups of polysiloxane, being substituted or unsubstituted monovalent hydrocarbon groups, being identical to, different from, or partially different from each other;

A, B, and C are alkylene groups, being identical to, different from, or partially different from each other; and X is the protecting group.

6. The cleaning blade according to claim 5, wherein the alkylene oxide block comprises two or more alkylene oxide repeating units.

7. The cleaning blade according to claim 1, wherein the blade has a dynamic friction coefficient lower than 0.90.

8. The cleaning blade according to claim 1, wherein the blade has an international rubber hardness degree of 60 or higher.

9. The cleaning blade according to claim 1, wherein the modified silicone oil (c) has a structure represented by Chemical formula (1) or (2):

[Chemical Formula 1]

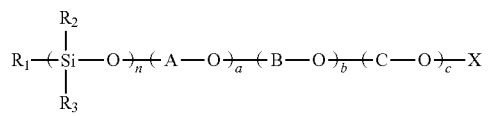

(1)

[Chemical Formula 2]

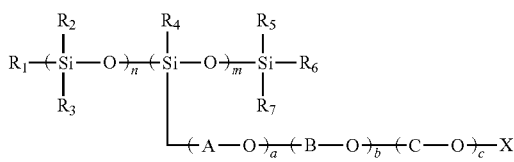

(2)

where n, m, a, b, and c represent repeating unit numbers, n, m, and a being integers of one or more, b and c being integers of zero or one or more;

R1 to R7 are organic groups of polysiloxane, being substituted or unsubstituted monovalent hydrocarbon groups, being identical to, different from, or partially different from each other;

A, B, and C are alkylene groups, being identical to, different from, or partially different from each other; and X is the protecting group.

10. The cleaning blade according to claim 1, wherein the alkylene oxide block comprises two or more alkylene oxide repeating units.

* * * * *